(12) United States Patent
Appellof et al.

(10) Patent No.: US 7,672,979 B1
(45) Date of Patent: Mar. 2, 2010

(54) BACKUP AND RESTORE TECHNIQUES USING INCONSISTENT STATE INDICATORS

(75) Inventors: Carl J. Appellof, Arroyo Grande, CA (US); Dale Cardin, San Luis Obispo, CA (US); Terrence Asgar-Deen, San Luis Obispo, CA (US)

(73) Assignee: Symantec Operating Corporation, Mountain View, CA (US)

( * ) Notice: Subject to any disclaimer, the term of this patent is extended or adjusted under 35 U.S.C. 154(b) by 524 days.

(21) Appl. No.: 11/177,813

(22) Filed: Jul. 8, 2005

Related U.S. Application Data

(60) Provisional application No. 60/674,224, filed on Apr. 22, 2005.

(51) Int. Cl.
    *G06F 17/30* (2006.01)
(52) U.S. Cl. .................. 707/204; 707/203; 711/162; 714/6
(58) Field of Classification Search .............. 707/100, 707/104.1, 200–204; 714/6, 13; 713/193; 711/161–162; 709/217
    See application file for complete search history.

(56) References Cited

U.S. PATENT DOCUMENTS

| | | | | |
|---|---|---|---|---|
| 5,765,173 | A * | 6/1998 | Cane et al. | 707/204 |
| 6,035,412 | A * | 3/2000 | Tamer et al. | 714/6 |
| 6,076,148 | A * | 6/2000 | Kedem | 711/162 |
| 6,513,051 | B1 * | 1/2003 | Bolosky et al. | 707/204 |
| 6,912,629 | B1 * | 6/2005 | West et al. | 711/161 |
| 7,017,019 | B2 * | 3/2006 | Watanabe et al. | 711/162 |
| 7,133,884 | B1 * | 11/2006 | Murley et al. | 707/202 |
| 7,194,487 | B1 * | 3/2007 | Kekre et al. | 707/201 |
| 7,225,204 | B2 * | 5/2007 | Manley et al. | 707/200 |
| 7,228,398 | B2 * | 6/2007 | Iwamura et al. | 711/162 |
| 7,240,219 | B2 * | 7/2007 | Teicher et al. | 713/193 |
| 7,246,211 | B1 * | 7/2007 | Beloussov et al. | 711/162 |
| 2002/0143779 | A1 * | 10/2002 | Backman | 707/100 |
| 2003/0149709 | A1 * | 8/2003 | Banks | 707/200 |
| 2003/0182322 | A1 * | 9/2003 | Manley et al. | 707/201 |
| 2004/0236916 | A1 * | 11/2004 | Berkowitz et al. | 711/162 |

(Continued)

OTHER PUBLICATIONS

Dave Hitz, James Lau, and Michael Malcolm, File System Design for NFS File Server Appliance, Network Appliance, Technical Report 3002, Jan. 19, 1994.*

(Continued)

*Primary Examiner*—Neveen Abel Jalil
*Assistant Examiner*—Vei-Chung Liang
(74) *Attorney, Agent, or Firm*—Meyertons, Hood, Kivlin, Kowert & Goetzel, P.C.

(57) ABSTRACT

A method for backup and restore using inconsistent state indicators comprises identifying, from among a plurality of data objects to be backed up, one or more data objects that are in an inconsistent state, and storing inconsistent state indicators (such as modified object attributes) associated with the data objects. The method may further include generating a backup aggregate such as a snapshot of the plurality of data objects, where the backup aggregate includes backup versions of the inconsistent data objects. Prior to restoring one or more data objects from the backup aggregation, the method may include using the inconsistent state indicators to identify the backup versions that correspond to the inconsistent data objects, e.g., to exclude backup versions corresponding to inconsistent data objects from a list of full restoration candidates.

19 Claims, 7 Drawing Sheets

U.S. PATENT DOCUMENTS

| | | | |
|---|---|---|---|
| 2004/0260726 A1* | 12/2004 | Hrle et al. | 707/104.1 |
| 2005/0027956 A1* | 2/2005 | Tormasov et al. | 711/162 |
| 2005/0050110 A1* | 3/2005 | Sawdon et al. | 707/201 |
| 2005/0120093 A1* | 6/2005 | Nakano et al. | 709/217 |
| 2005/0165868 A1* | 7/2005 | Prakash | 707/204 |
| 2005/0182797 A1* | 8/2005 | Adkins et al. | 707/200 |
| 2005/0188256 A1* | 8/2005 | Stager et al. | 714/13 |
| 2005/0216682 A1* | 9/2005 | Shinozaki et al. | 711/162 |
| 2005/0228836 A1* | 10/2005 | Bacastow et al. | 707/204 |
| 2006/0064444 A1* | 3/2006 | van Ingen et al. | 707/204 |
| 2006/0106878 A1* | 5/2006 | Shitomi et al. | 707/200 |
| 2007/0136381 A1* | 6/2007 | Cannon et al. | 707/200 |

OTHER PUBLICATIONS

Sailesh Chutani, Owen T. Anderson, Michael L. Kazar, Bruce W. Leverett, W. Anthony Mason, Robert N. Sidebotham, The Episode File System, Proceedings of the USENIX Winter 1992 Technical Conference, p. 43-60.*

"Overview of HSQLDB Replication (HSQLDB/R)"; Ban; Sep. 2002; 'Internet; http://www.jgroups.org/javagroupsnew/docs/hsqldbr/design.pdf.

"File System Design for an NFS File Server Appliance"; Hitz, et al; USENIX; San Francisco, CA, Jan. 19, 1994.

"The Episode File System"; Chutani, et al; Proceedings of the USENIX Winter 1992 Technical Conference; Jan. 1992.

* cited by examiner

BACKUP AND RESTORE TECHNIQUES USING INCONSISTENT STATE INDICATORS

This application claims the benefit of U.S. provisional patent application Ser. No. 60/674,224, entitled "Advanced Techniques For Data Protection And Restoration", filed Apr. 22, 2005.

BACKGROUND OF THE INVENTION

1. Field of the Invention

This invention relates to computer systems and, more particularly, to backup and restoration of data within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of factors, such as system crashes, hardware storage device failures, software defects, or user errors (e.g., an inadvertent deletion of a file) may potentially lead to data corruption or to a loss of critical data in such environments. In order to recover from such failures, various kinds of backup techniques may be employed. Traditionally, for example, backup images of critical data may have been created periodically (e.g., once a day) and stored on tape devices. However, a single backup version of production data may not be sufficient to meet the availability requirements of modern mission-critical applications. For example, for disaster recovery, it may be advisable to back up the data of a production application at a remote site, but in order to be able to quickly restore the data in the event of a system crash or other error unrelated to a large-scale disaster, it may be advisable to store a backup version near the production system. As a consequence, in some storage environments, multiple stages of backup devices or hosts may be employed. A first backup version of a collection of production files may be maintained at a file system at a secondary host, for example, and additional backup versions may be created periodically at tertiary hosts from the secondary host file system. The use of multiple stages may also help to reduce the impact of backup operations on production application performance. In some environments, multiple layers of additional backup versions may be generated for additional enhancements to availability: for example, production data may be copied from a production host or server to a first layer backup host, from the first layer to a second layer, from the second layer to a third layer, and so on.

In some storage environments where multiple stages of backup are implemented, the backup operations at different stages may be performed according to independent schedules. For example, a replicator (which may also be termed a replication engine) may be configured to periodically synchronize a replica of a primary data object set according to a first schedule, and a snapshot generator may be configured to create snapshots or point-in-time copies from the replica according to a second schedule. The snapshot generator may not be aware of the replication state of various data objects of which a snapshot is to be taken—that is, some data objects may only partially replicated or partially synchronized at the time that a snapshot is scheduled. If a snapshot includes a point-in-time copy of an inconsistent data object (e.g., a replica that is not fully consistent with its corresponding primary object), and the snapshot is used as a source for data restoration, data corruption may occur if the copy of the inconsistent data object is restored. Requiring that all replicated data objects must be in a consistent state at the time a snapshot is generated may be impractical, especially in environments where multiple streams of replication and/or snapshot generation are supported and are independently scheduled with respect to each other. For example, if replicas of several 100 GB file are being synchronized, waiting for the replication of the files to complete before generating a snapshot may result in a disruption of a desired snapshot schedule.

SUMMARY

Various embodiments of methods and systems for backup and restore using inconsistent state indicators are disclosed. According to one embodiment, a method comprises identifying, from among a plurality of data objects to be backed up, one or more data objects that are in an inconsistent state, and storing inconsistent state indicators associated with the data objects. For example, the plurality of data objects may be secondary files to which primary files are being replicated in one embodiment, and a particular secondary file may be considered to be in an inconsistent state if replication or synchronization of the corresponding primary file to the particular secondary file has begun but has not yet been completed. A number of different inconsistent state indicators may be employed in different embodiments—for example, a modified value of a create-time attribute of the data object may serve as an inconsistent state indicator in some embodiments. In one implementation, a large time interval value may be subtracted from the current create-time attribute value to serve as an indicator of inconsistent state, e.g., the create-time value may be set to "Jan. 5, 1905, 10:00:00 AM" instead of "Jan. 5, 2005, 10:00:00 AM". The modified attribute value (e.g., a creation-time value set in the distant past, before the development of modern computer systems) may be easily recognized as evidence indicating a "special" or inconsistent data object. The method may further include generating a backup aggregate such as a snapshot of the plurality of data objects, where the backup aggregate includes backup versions of the inconsistent data objects. In some embodiments, the inconsistent state indicators may be automatically included within the backup aggregation, e.g., a volume-level snapshot may store create-time attributes of each of the files of the volume by default. Modifying object attributes may in the manner described above may be an efficient way of distinguishing inconsistent backup versions from consistent ones, without requiring additional storage or excessive processing overhead.

Prior to restoring one or more data objects from the backup aggregation, the method may include using the inconsistent state indicators to identify the backup versions that correspond to the inconsistent data objects. For example, in one embodiment, a list of restorable backup versions included within the backup aggregate may be generated, and the backup versions that correspond to the inconsistent data objects (such as the partially replicated data files) may be excluded from the list. In another embodiment, two lists may be generated: a first list of backup versions from which full restores may be performed, and a second list from which partial restores or "best-effort" restores may be performed. Backup versions with which inconsistent state indicators are associated may be included in the second list, while backup versions with which inconsistent state indicators are not associated may be included in the first list. If 95% of a 100 Gigabyte file has been replicated at the time a snapshot is created from the replica, for example, the ability to restore from the partially replicated version of the file may be useful, especially if the original file and its other backup versions become unavailable.

In addition to the technique of modifying a create-time attribute noted above, a variety of techniques may be used in different embodiments to implement the inconsistent state indicators. For example, in one embodiment, where an operating system supports the capability of including an alternate stream to a file (i.e., in addition to the data of the file in a primary stream, the operating system supports the storage of metadata in one or more alternate stream), an alternate file stream may be used to store an indication of an inconsistent state of the file. In other embodiments, object attributes other than create time (such as file size, owner, etc.) may be modified to indicate inconsistent state. In one embodiment, a list of the inconsistent backup versions may be stored, e.g., in a catalog or database external to the backup aggregation, and such a list may be used to distinguish fully-restorable backup versions from inconsistent backup versions.

Figure 1:
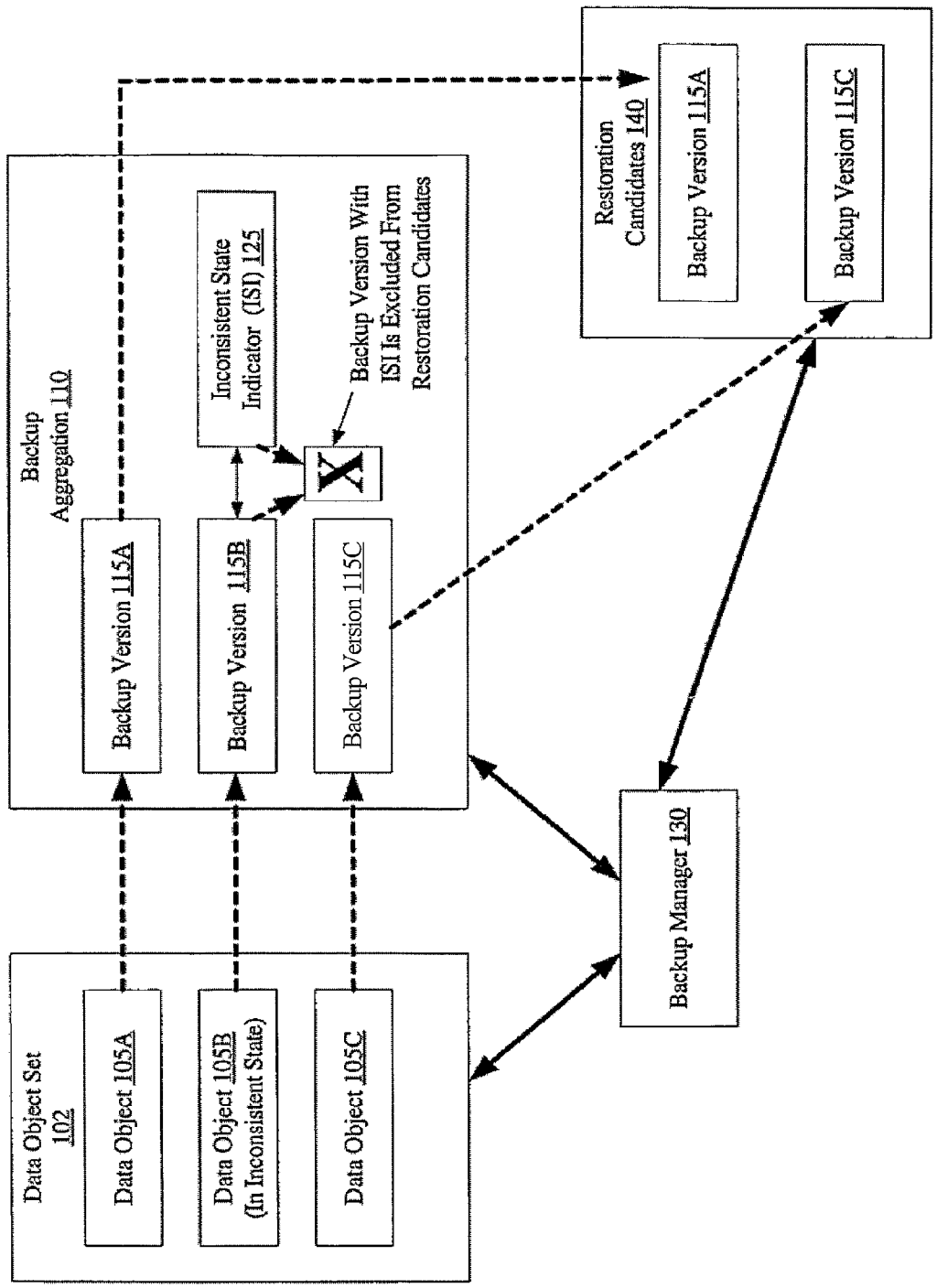
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system according to one embodiment. As shown, the system includes a backup manager 130 and a plurality of data objects 105 (e.g., data objects 105A, 105B and 105C) of a data object set 102 that are to be backed up. Backup manager 130 may be configured to identify any of the data objects 105 that are in an inconsistent state at the time that the data objects are backed up, and to store information identifying such data objects as being in the inconsistent state. The state of a data object may be termed to be "inconsistent" herein if, for example, the following condition holds. If a backup version of the data object is generated while the data object is in the inconsistent state, and the backup version is then used to restore the data object, at least a portion of the data expected to be in the restored object would be either missing or invalid. In some cases, an application or a user that accesses the restored version of an inconsistent data object may be capable of recognizing the restored version as an incomplete or corrupted version of the data object, while in other cases, the data corruption or incompleteness may be undetected at least temporarily, and may eventually lead to potentially serious errors and/or failures whose root cause may be hard to detect. One example of an inconsistent data object 105 is a partially replicated file, e.g., a file at a secondary host that is in the process of being replicated from a corresponding file at a primary host, where the replication is not yet complete.

In various embodiments, any of a number of different techniques may be used by backup manager 130 to identify that a particular data object is in an inconsistent state, as described below in further detail. For example, a replicator (e.g., a component of the backup manager 130 that is configured to process replication jobs) may be configured to maintain a list of data objects that are currently in the process of being replicated, and are therefore inconsistent, and the list may be used to identify the inconsistent data objects. In FIG. 1, data object 105B is in an inconsistent state, and backup manager 130 may be configured to store an inconsistent state indicator (ISI) 125 corresponding to data object 105B. Examples and details of specific types of inconsistent state indicators, such as modified object attribute values, that may be used in various embodiments are provided below. Backup manager 130 may be configured to generate a backup aggregation 110 comprising respective backup versions 115 (i.e., 115A-115C) of each of the data objects 105, including a backup version 115B corresponding to the data object 105B that was in an inconsistent state. The term "backup aggregation", as used herein, refers to a collection of backup versions of a set of data objects and configuration information for the backup versions. As shown in FIG. 1, ISI 125 may be stored within backup aggregation 110 in some embodiments, e.g., along with the backup version 115B of the inconsistent data object 105B, while in other embodiments the ISI may be stored separately from the backup aggregation.

Prior to restoring from one or more of the backup versions 115, backup manager 130 may be configured to use ISI 125 to identify the backup version 115B as being a backup version of an inconsistent data object. The treatment of such backup version or versions identified during restoration may differ from the treatment of backup versions of consistent data objects. For example, in the embodiment shown in FIG. 1, backup manager 130 may be configured to generate a list or display of restoration candidates 140 (i.e., backup versions from which users may restore data objects). As indicated by the box labeled with an "X", backup manager 130 may be configured to use the ISI 125 to exclude backup version 115B from the list of restoration candidates 140. As shown in FIG. 1, backup versions 115A and 115C, which do not have associated ISIs, may be included in the restore candidate list. In some embodiments, ISIs 125 may be implemented efficiently by modifying attributes (such as create time attributes) of the data objects 105 that are automatically included within backup aggregate 110, without resorting to the use of external databases, as described below in further detail. Backup manager 130 may be configured to examine the modified attributes of the file to identify the backup versions that correspond to inconsistent data objects in such embodiments, thus ensuring that restoration operations do not result in inadvertent data corruption, without incurring excessive processing or communication overhead.

The term "data object", as used herein, may refer to any collection of one or more data items for which backup and restore functionality may be desired, such as one or more individual files, file systems, directories (which may also be termed "folders"), logical volumes, database entities such as tablespaces, tables or indexes, etc. In one embodiment, data object set 102 may be stored at a first computer host, and backup aggregation 110 may be stored at a second computer host linked to the first host via a network. In another embodiment, data object set 102 and backup aggregation 110 may be stored within the same host. Various components of backup manager 130 (e.g., a replicator, a snapshot generator, or a restoration engine) may be incorporated within the first and second hosts, as described below in further detail. Backup aggregation 110 associated with data object set 102 may be generated and/or maintained using any of a variety of backup techniques in different embodiments, such as various types of replication (e.g., synchronous or asynchronous replication), snapshot or frozen image creation techniques.

Figure 2:
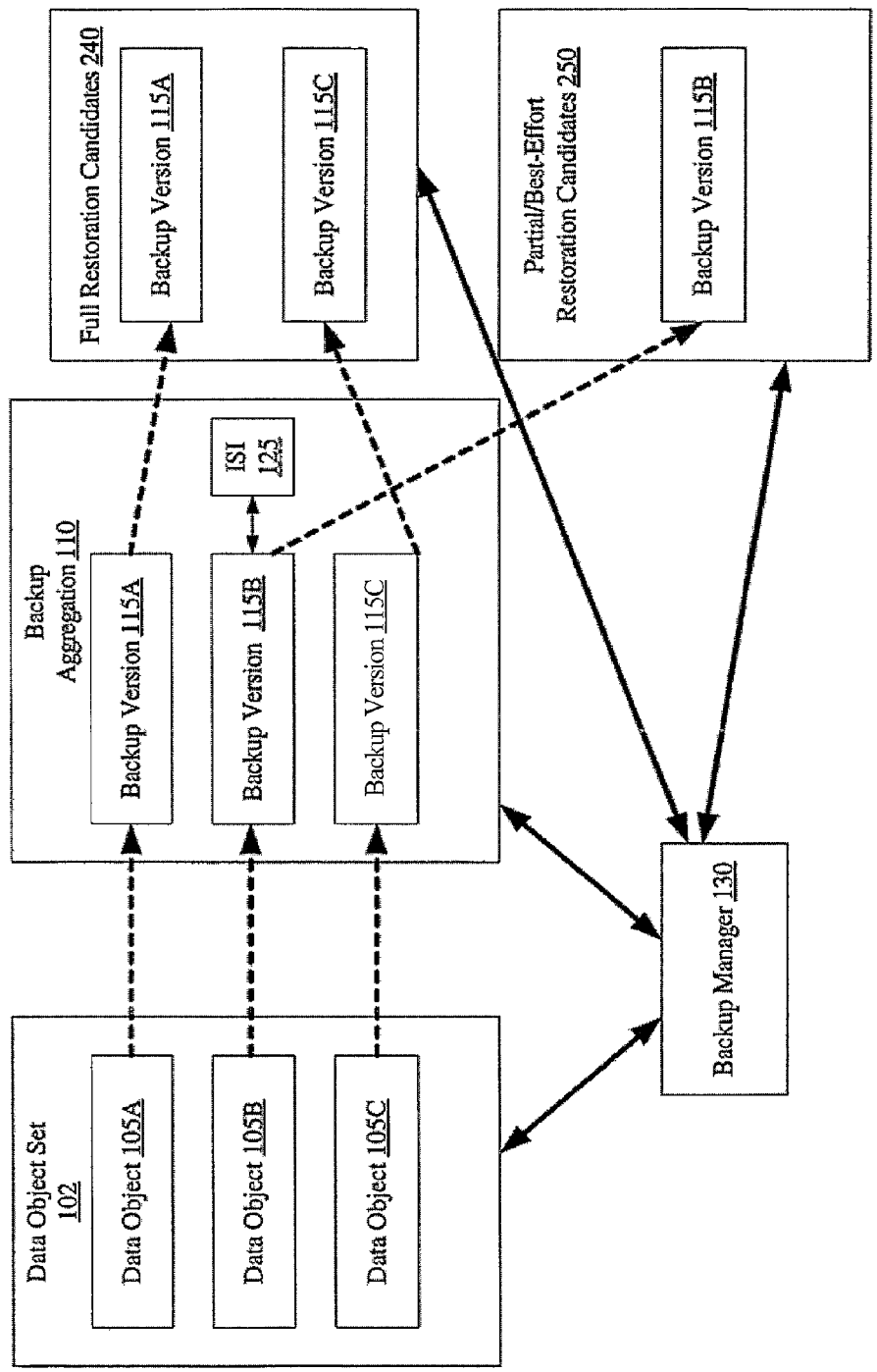
FIG. 2 is a block diagram illustrating an embodiment where a backup manager may be configured to support both full restoration and partial or best-effort restoration.

In some embodiments, backup manager 130 may be configured to support more than one type of restoration operation. FIG. 2 is a block diagram illustrating one such embodiment, where backup manager 130 may be configured to support both full restoration and partial or "best-effort" restoration. Under some circumstances, it may be appropriate for backup manager 130 to allow restorations even from those backup versions 115 that are known to be inconsistent, i.e., the backup objects 115 that have ISIs associated with them. For example, if a 100 Gigabyte file was 95% replicated at the time a snapshot of the file replica was taken, and the primary version as well as the replica were later lost or inadvertently overwritten, restoring the 95% of the file that was included in the snapshot may be useful, especially when compared to the alternative of losing 100% of the file. As shown in FIG. 2, two sets of restoration candidates may be generated in some embodiments: a set of full restoration candidates 240, and a set of partial or "best-effort" restoration candidates 250. The full restoration candidates 240 may include the backup versions, such as 115A and 115C, that are known to be backup versions of consistent data objects 105, and the partial/best-effort restoration candidates 250 may include the backup versions with associated ISIs 125, such as backup version 115B. Candidates 250 may be identified as "best-effort" restoration candidates in some embodiments because backup manager 130 may not guarantee that the restored objects derived from candidates 250 will be consistent, and may instead only make a best effort to restore as much of the data object as possible. In some embodiments, partial/best-effort restoration capabilities may be provided only to administrators or a selected group of authorized users, while full restoration capabilities may be provided to end users for the data objects that they are authorized to access and/or modify. In one embodiment, partial restoration capabilities may be provided via a special interface (such as an "advanced options" button or tab on a graphical user interface or GUI, or via a GUI or a command-line interface that is only accessible to privileged users) that may not be available to most end users.

Figure 3:
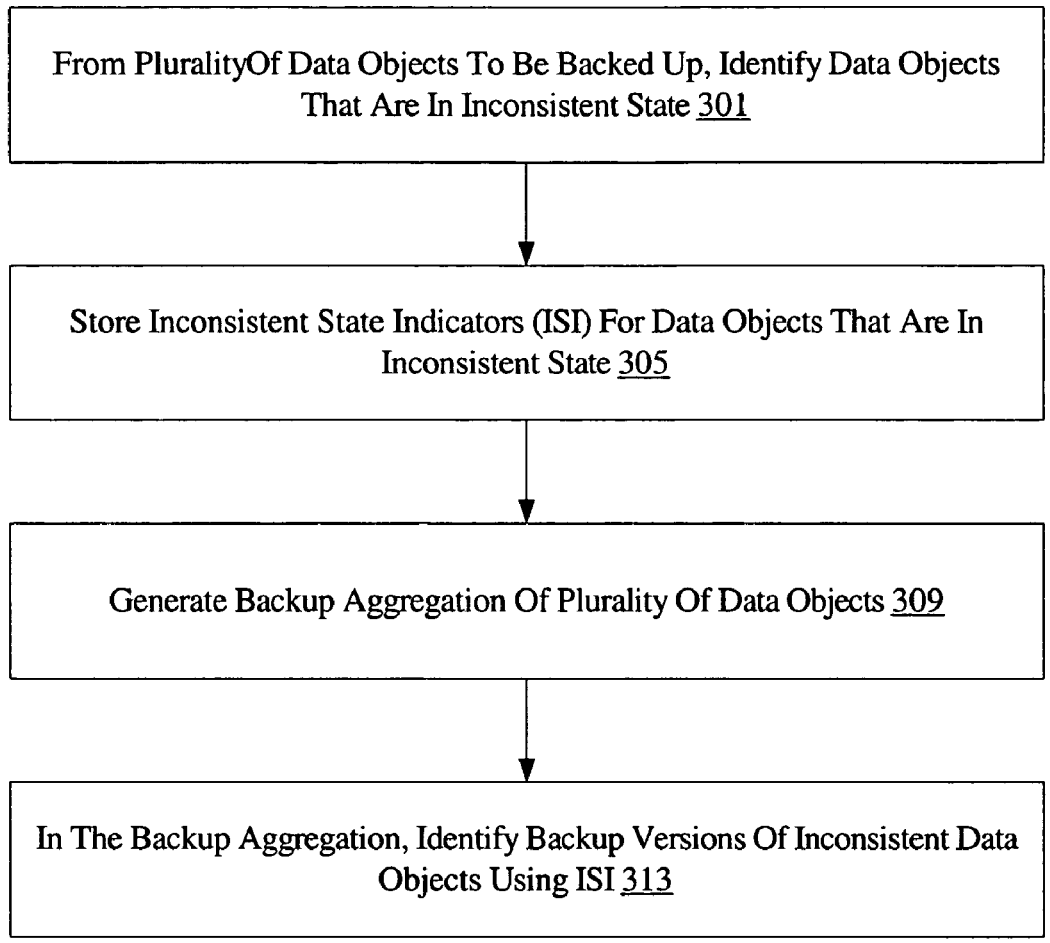
FIG. 3 is a flow diagram illustrating aspects of the operation of a backup manager, according to one embodiment.

FIG. 3 is a flow diagram illustrating aspects of the operation of backup manager 130, according to one embodiment. From among a plurality of data objects 105 that are to be backed up, backup manager 130 may be configured to identify data objects that are in an inconsistent state (block 301 of FIG. 3). In one embodiment, for example, the plurality of data objects may include a set of files at a secondary host that form part of a replica of a set of primary files at one or more primary hosts. The replication may be performed by a multi-threaded replicator (which may be a component of backup manager 130 or may be implemented as an independent entity), with each thread responsible for replication of one or more primary files. The replicator may be configured to maintain a list of the files whose replication is currently in progress or incomplete, and backup manager 130 may be configured to access the list to identify the replica files that are not yet fully replicated and hence inconsistent. Backup manager 130 may be configured to associate and store an inconsistent state indicator (IS) 125 for the data objects that are in an inconsistent state (block 305 of FIG. 3), and to generate a backup aggregation 110 corresponding to the plurality of data objects (block 309). In some embodiments, the ISIs 125 may be stored within the backup aggregation 110—e.g., if the ISIs are modified versions of object attributes such as create times that may be automatically included within backup aggregations such as snapshots—while in other embodiments, the ISIs may be stored in a separate database. Backup manager 130 may be configured to use the ISIs to identify those backup versions 115 within backup aggregate 110 that correspond to inconsistent data objects 105 (block 313). For example, prior to performing a restore operation from backup aggregate 110, backup manager 130 may be configured to ensure that the backup version 115 from which a particular data object is restored does not have an ISI associated with it.

In one embodiment, instead of or in addition to storing inconsistent state indicators, backup manager 130 may be configured to store consistent state indicators associated with backup versions that were generated from data objects 105 that were in a consistent state. In one implementation where only consistent state indicators are used, the absence of a consistent state indicator associated with a particular backup version 115 may be indicative of the particular backup version having been generated from a data object 105 in an inconsistent state. That is, the absence of a consistent state indicator for a given backup version 115 in such an embodiment may be equivalent to the presence of an ISI 125 in an embodiment where ISIs are employed.

Figure 4:
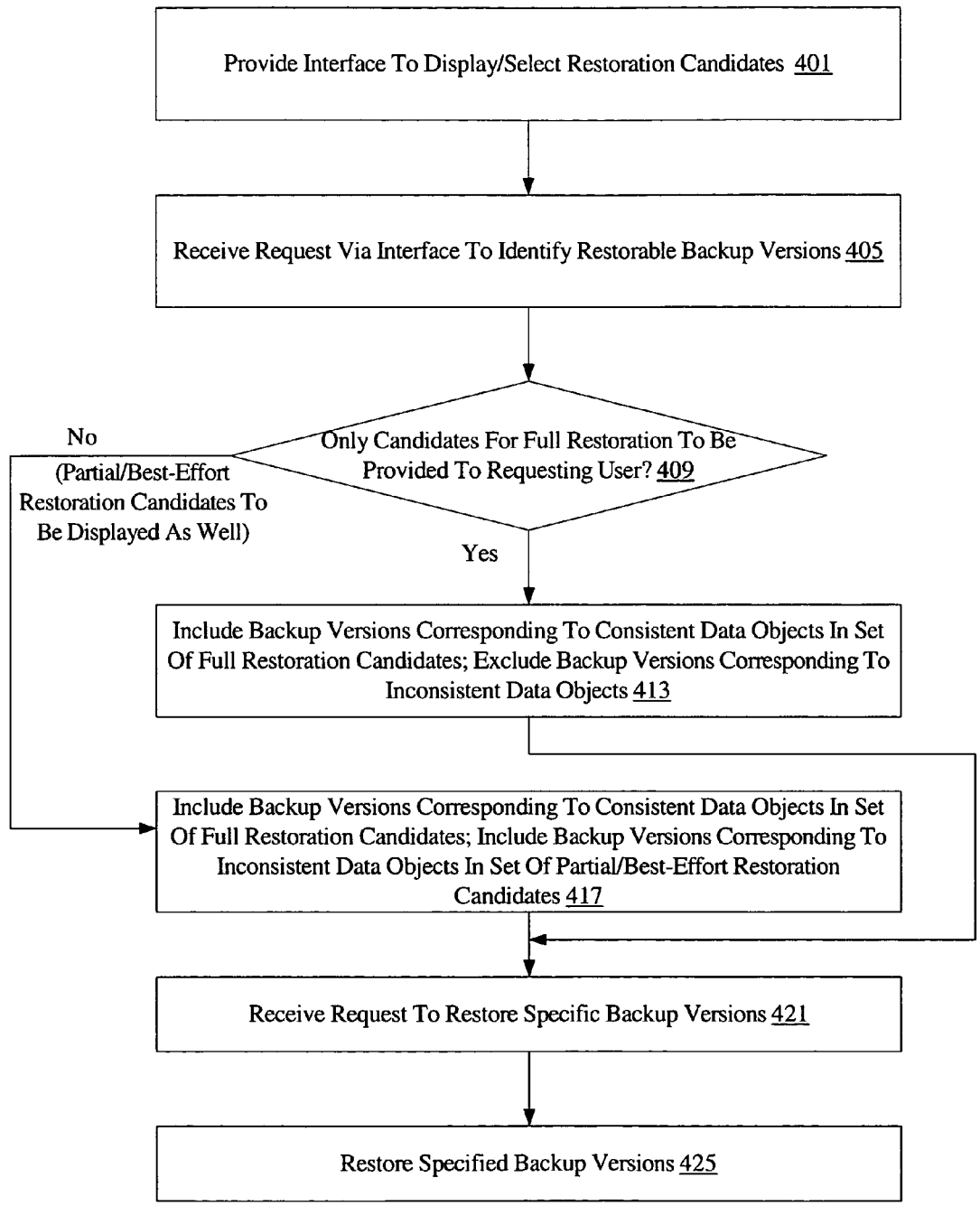
FIG. 4 is a flow diagram illustrating aspects of the operation of a backup manager during restore operations, according to one embodiment.

FIG. 4 is a flow diagram illustrating aspects of the operation of backup manager 130 during restore operations, according to one embodiment. As shown in block 401, backup manager 130 may be configured to provide an interface, such as a graphical user interface, a web-based interface or a command-line interface, to display restoration candidates to a user and/or to allow a user to select a particular backup version 115 from which restoration is to be performed. As noted above in conjunction with the description of FIG. 2, in some embodiments, separate interfaces may be provided for administrators and for end users, while in other embodiments a single interface may be shared by both administrative users and users who do not have administrative privileges. In some embodiments, the users and/or administrators may be allowed to issue search requests for backup versions and/or current or on-line versions of data objects using the interface, where the search requests may include specifications of one or more search criteria (such as names, storage locations, or other attribute values). Content-based searching of backup versions 115 may be supported in some embodiments, e.g., by specifying keywords or search terms for text documents. On receiving a request to identify restorable versions of backup objects 115 (block 405), e.g., based on a specified set of search criteria, the backup manager may be configured to make a determination whether only candidates for full restoration are to be identified to the requesting user, or whether candidates for partial/best-effort restoration are also to be identified (decision block 409). As described above, full restoration candidates may include backup versions 115 that do not have associated ISIs 125, while candidates for partial/best-effort restoration may include those backup versions 115 that have associated ISIs 125.

If only full restoration candidates are to be provided to the requesting user, backup manager 130 may be configured to search the set of backup versions and ISIs (using the search criteria provided by the user, if any), and to include only the backup versions 115 corresponding to consistent data objects (i.e., the backup versions that do not have associated ISIs) within the set of restoration candidates listed or displayed (block 413). If both fill and partial/best-effort candidates are to be provided, the backup versions with ISIs (i.e., the backup versions corresponding to inconsistent data objects) may be included in the partial/best-effort list or display, and the backup versions without ISIs may be included in the full restoration list or display (block 417). On receiving a request to restore a specified backup version (either a full restoration candidate or a partial restoration candidate) (block 421), the backup manager 130 may restore the specified version (block 425). In some embodiments, two different interfaces (e.g., two different commands on a command line) may be used: one to find the set of restoration candidates and one to request the restoration of a specified version. The restoration request interface may also allow the specification of a restoration target, i.e., a storage location where the restored data is to be stored.

Figure 5:
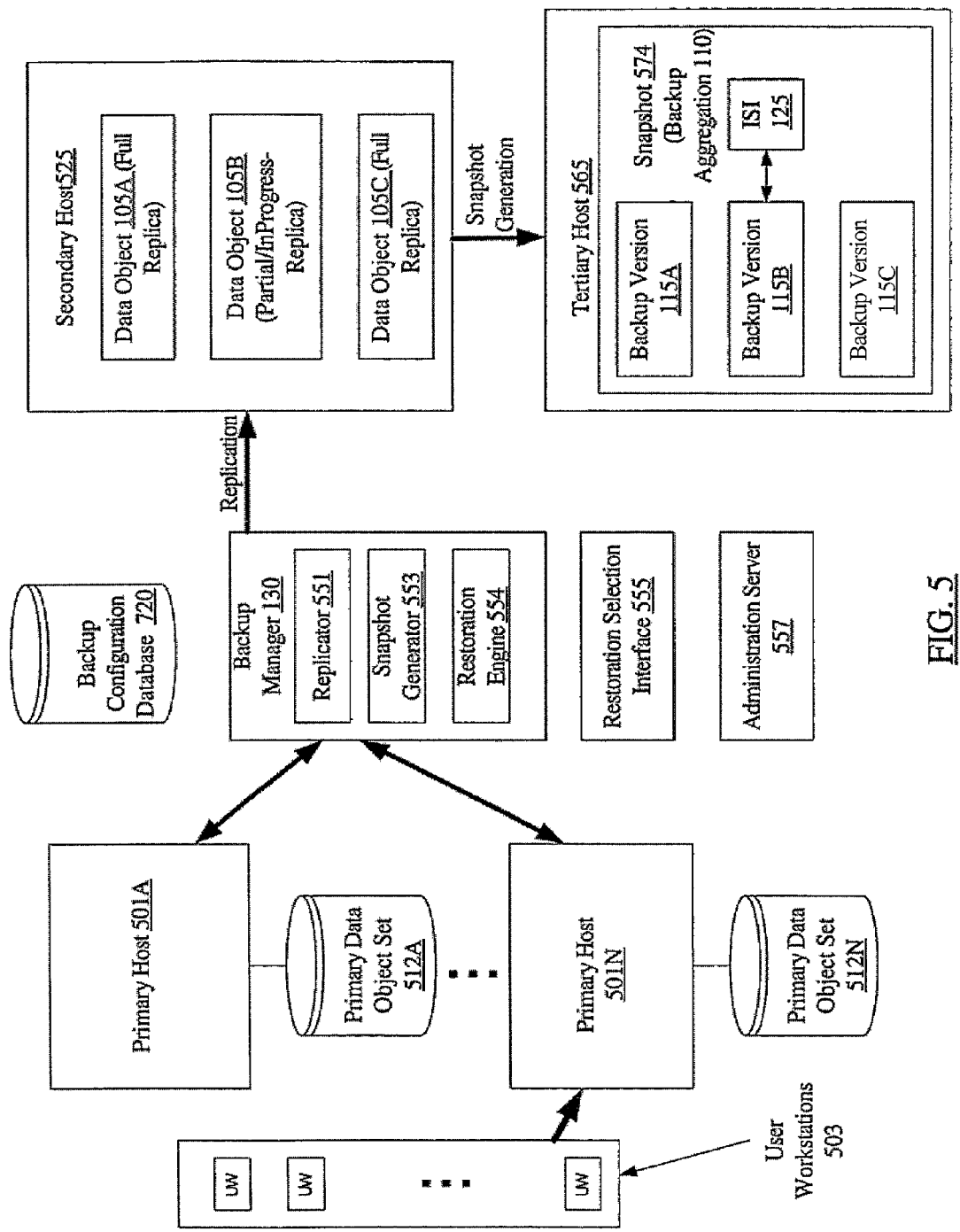
FIG. 5 is a block diagram illustrating an embodiment where data objects of which backup versions are created are generated by replicating primary data objects at a secondary host, according to one embodiment.

FIG. 5 is a block diagram illustrating an embodiment where the data objects 105 are generated by replicating primary data objects at a secondary host 525, according to one embodiment. As shown, primary hosts 501A-501N may each include a respective set of primary data objects 512—e.g., primary host 501A may include primary data object set 512A, primary host 501N may include primary data object set 512N, etc. The primary data object sets 512 may represent data of various applications being executed, for example, on behalf of a plurality of users at user workstations (UW) 503. In one embodiment, for example, one of the applications being supported by one or more primary hosts 501 may be an on-line banking service, or an Internet auction service. As input from the user workstations is received, corresponding data transactions may be initiated, which may result in updates to primary data objects within object sets 512.

In one embodiment, a replicator 551 within the backup manager 130 may be configured to periodically replicate data from one or more of the primary hosts 501 to secondary host 525. In some embodiments, the replication operations for different primary data object sets 512 may be scheduled and managed independently of each other. For example, primary host 501A may support a data mining application whose data sets do not change very often, and the primary data object set 512A may be replicated once every six hours to a particular destination volume at secondary host 525. In the same example, primary host 510N may be support an online transaction processing system such as an airline reservation system, whose data is updated fairly rapidly, and the primary data objects set 512N may be replicated once every ten minutes (or via continuous or real-time replication as described below) to the same destination volume or a different destination volume at secondary host 525. To maintain point-in-time copies of the primary application data objects, a snapshot generator 553 may be configured to generate backup aggregations 110 in the form of snapshots 574, e.g., once every hour, from the secondary host to tertiary host 565. As shown in FIG. 5, the snapshot may include ISIs 125 in addition to point-in-time backup versions 115. The snapshot generator 553 and the replicator 551 may be configured to perform their respective operations asynchronously with respect to one another, i.e., according to independent schedules. Snapshots 574 may be generated using any of a variety of specific techniques by snapshot generator 553, e.g., using operating system-provided snapshot functionality, volume-level mirroring, space efficient snapshot techniques, or custom hardware snapshot techniques. As a result of the independent and/or asynchronous operation of replicator 551 and snapshot generator 553, one or more data objects 105 at the secondary host 525 may be in the process of being updated or synchronized with a primary data object at the time a snapshot 574 is scheduled. For example, as shown in FIG. 5, data objects 105A and 105C may be full replicas of their corresponding primary data objects at the time a snapshot 574 is to be generated, while data object 105B may be a partial or in-progress replica of its corresponding primary objects.

Information maintained by the replicator 551, such as a list of data objects 105 to which replication operations are in progress, may be used to identify the set of data objects 105 that are in an inconsistent state in some embodiments, as described below in conjunction with the description of FIG. 6. In other embodiments, other techniques may be used to identify the set of secondary data objects 105 that represent incompletely replicated files. For example, in one embodiment a data object attribute such as a "last-modified time" attribute or a size attribute may be used to identify the files that are being modified and are likely to be inconsistent—e.g., if the last-modified time attribute for a particular data object 105 differs from the current time by less than a few seconds, backup manager 130 may be configured to re-examine the attribute after a specified time interval, and to assume that the particular data object 105 is in an inconsistent state if its attribute values have changed during the interval.

In some embodiments, primary hosts 501 may include respective change monitors (not shown in FIG. 5) that may be configured to monitor a specified set of data objects of a corresponding primary data object set 512 for changes. When changes such as object creations, deletions or modifications are detected, the change monitor may be configured to inform the backup manager 130 (e.g., via a journaling mechanism), and a replicator 551 within the backup manager may be configured to replicate the changes at a secondary host 525. In some implementations, replicator 551 may be configurable to perform replication operations in either direction, as desired—e.g., from primary hosts to secondary hosts, or from secondary hosts to primary hosts.

In one specific embodiment, a change monitor may be configured to detect a variety of I/O operations (e.g., operations to read, write, or modify attributes such as security or ownership attributes of files) performed on the set of primary data objects, and to notify the backup manager 130 of the I/O operation detected. Replicator 551 may be configured to then replicate the I/O operation at secondary host 525. In this way, changes being made at primary hosts 501 may be very quickly reflected at the secondary host 525 e.g., the state of the backed up versions of primary data objects at secondary host 525 may track the state of the primary object data sets 512 to within a few seconds or even to within a few milliseconds in some implementations. Such a replication process, in which changes being made to the primary data objects are detected and replicated in real time may be termed "continuous replication" or "real-time replication", and the backup manager 130 may be termed a "continuous protection server" in embodiments supporting continuous replication. Change monitors may be implemented via file system filter drivers in some embodiments, which may be configured to intercept I/O operations as they are executed at the primary hosts 501. In one embodiment, change monitors may be configured to periodically check for changes to data objects, instead of continuously monitoring for changes. In another embodiment, the replication process may include a synchronization of a primary data object set 512 (e.g., a file system) with a replica at secondary host 525, with the additional capability of monitoring and replicating changes that occur at the source data set after the synchronization begins—that is, both synchronization and continuous replication may be performed by backup manager 130. In some embodiments, backup and restoration operations may be managed in units called jobs.

In embodiments where continuous or real-time replication is supported, an initial period of synchronization between the primary and secondary hosts may be required when replication of a primary data object set 512 is started, and additional periods of synchronization between the primary and secondary hosts may also be needed from time to time (e.g., if a primary data object set 512 is restored directly from tertiary host 565 and thus becomes unsynchronized with respect to the replica at the secondary host). During such periods, the contents of several primary data objects, some of which may be large, may be concurrently replicated at secondary host 525, and the replicated versions of such primary data objects may be in an inconsistent state for relatively long periods of time.

Secondary host 525 may serve as a staging area for backed up data between the primary hosts 501 and tertiary hosts 565 in the embodiment of FIG. 5. In some embodiments, tape devices or optical storage devices such as various types of jukeboxes may be used for tertiary storage, while in other embodiments, the tertiary storage devices may include disks, disk arrays and the like. Backup manager 130 may include a restoration engine 554 in some embodiments, which may be configured to implement restoration operations from secondary host 525 or from tertiary host 565. In such an embodiment, restoration engine 554 may provide a restoration selection interface 555, e.g., to allow a user and/or administrator to search for and specify identify the data objects that are to be restored as described above. In some implementations, the restoration selection interface may be a graphical user interface (GUI), while in other implementations, a command line or text-based interface may be used. In one implementation, restoration selection interface 555 may include a web page accessible via the Internet and/or an intranet. End users may be allowed to request restoration of storage objects using "user-friendly" names for the objects and/or using content-based search criteria, without, for example, specifying the exact logical paths or physical locations to the object to be restored or to the backup version from which restoration is desired.

Configuration information for backup operations, for example including locations of various versions of backed up objects, may be stored in backup configuration database 720 in one embodiment. In another embodiment, an administration server 557 may provide an interface such as an administrative console to configure and manage backup server 130 and its components, such as replicator 551 and snapshot generator 553. In one embodiment, in addition to backing up primary hosts 501, backup manager 130 may also be configured to back up data of one or more user workstations 503. In some implementations, any combination of replicator 551, snapshot generator 553 and restoration engine 554 may be implemented as independent modules or programs that may be invoked by backup manager 130 as needed.

Figure 6:
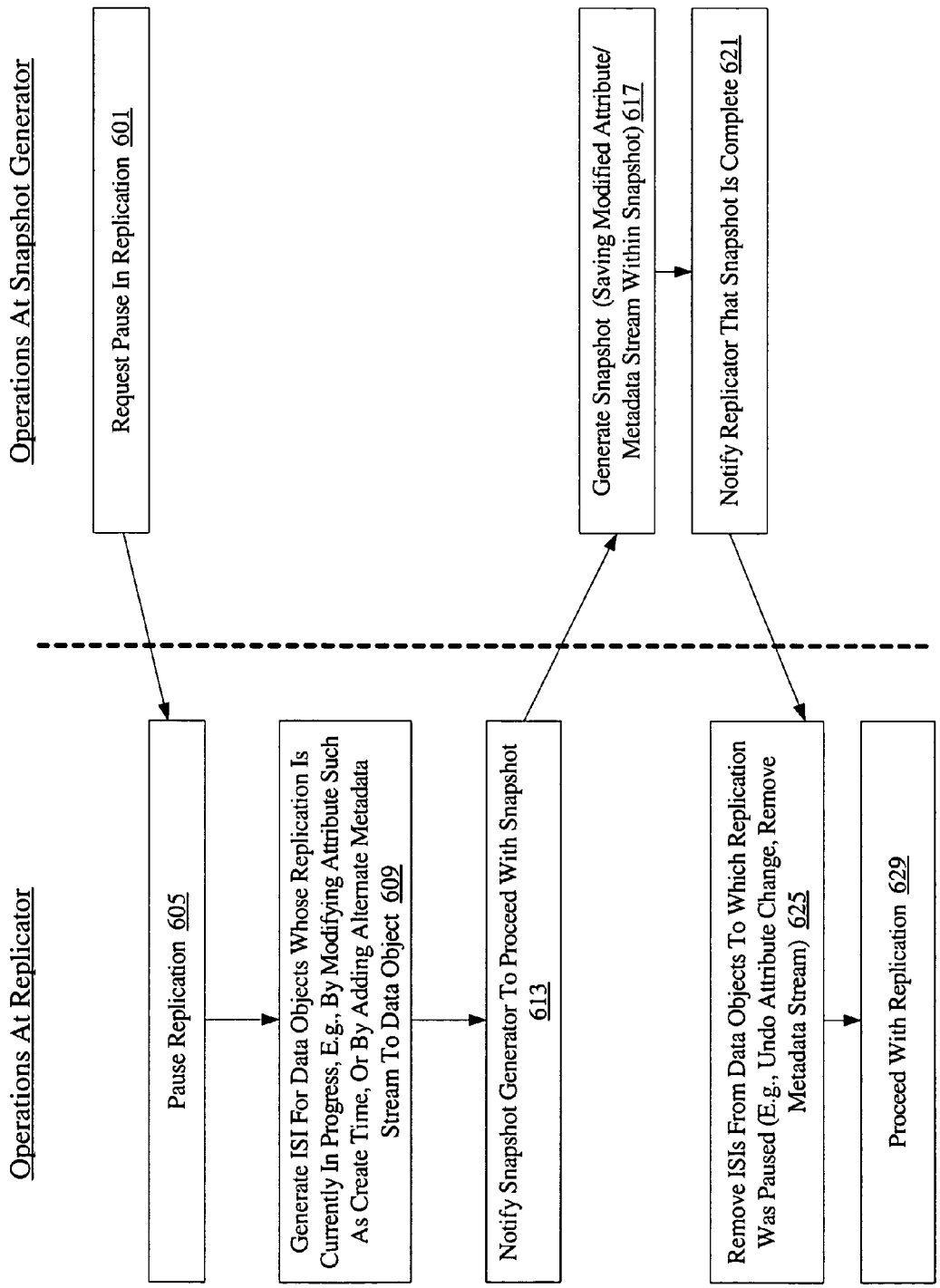
FIG. 6 is a flow diagram illustrating aspects of the operation of a replicator and a snapshot generator, according to one embodiment.

FIG. 6 is a flow diagram illustrating aspects of the operation of replicator 551 and snapshot generator 553, according to one embodiment. As noted earlier, replicator 551 may be configured to support the replication of one or more primary data object sets 512 at secondary host 525, using any of a variety of replication techniques. In some embodiments, the replication of one primary object set 512 (or of a portion of a primary object set) may be scheduled independently of the replication of another primary object set (or a portion of another primary object set). For example, replicator 551 may be configured to support multiple independent jobs, with each job corresponding to a different primary object set 512. Snapshot generator 553 may be configured to create a snapshot 574 (or a sequence of snapshots 574 generated according to a schedule) corresponding to any desired collection of data objects 105, such as all the data objects within a logical or physical volume, a file system, or a specified list of files, etc. The replicated version of the data corresponding to several replication jobs may be stored within a single snapshot-capable volume or file system at secondary host 525 in some embodiments, while in other embodiments, different snapshots 574 may be generated for each replication job. In some embodiments, while it may not be possible for snapshot generator 553 to identify the data objects 105 that are in an inconsistent state when a snapshot is to be created, replicatbr 551 may be capable of identifying the data objects such as 105B to which replication is in progress. In one such embodiment, snapshot generator 553 may be configured to interact with replicator 551 as shown in FIG. 6.

When a snapshot 574 of a particular collection of data objects 105 is to be created (e.g., according to a specified schedule such as "once every hour", or in response to a request by an administrator), snapshot generator 553 may be configured to send a request to replicator 551 to temporarily pause any replication that is in progress to that collection of data objects (block 601 of FIG. 6). The request may be sent using any desired protocol or communication technique in different embodiments, e.g., via shared memory, sockets, one or more signaling techniques supported by an operating system, or a custom messaging protocol designed for communications between various components of backup manager 130. On receiving the request, replicator 551 may be configured to pause replication in accordance with the request (block 605). (If no replication operations are currently being performed for the data objects of which a snapshot is to be generated, replicator 551 may be configured to notify snapshot generator 553 to proceed with the snapshot without any further interaction with replicator 551.) The replicator may then examine a list of currently progressing replication operations or streams, and identify each data object 105 that is not a full replica of its corresponding primary data objects. An inconsistent state indicator (ISI) 125 may be generated for each such data object (block 609).

A number of different techniques may be used to generate the ISI in different embodiments. For example, in embodiments where replication is being performed at a file level (e.g., where each data object 105 is a replicated file), replicator 551 may be configured to modify a file attribute, such as a create time attribute, whose value may be saved automatically with the file when snapshot 574 is created. That is, no additional operations (e.g., operations beyond those required during a normal generation of a snapshot) may be required to store the modified attribute within a snapshot 574. In one implementation, the file attribute may be modified in such a way that (a) an examination of the modified attribute value provides an unambiguous indication that the file was inconsistent or "special" in some way; (b) the modification may be performed without significant overhead; and (c) the modification may be reversed without significant overhead (i.e., the original, unmodified attribute value may be efficiently retrieved from the modified value). For example, the value for the create time attribute may be modified by logically "subtracting" a particular long time interval (e.g., 100 years) from the current create time. If the create time attribute value for a particular file is "Jan. 10, 2005, 08:00:00 AM", the replicator 551 may be configured to modify the create time to "Jan. 10, 1905, 08:00:00 AM" in such an implementation. Since computer data files in their modern form did not exist 100 years ago, the modified create time would be unambiguously indicate that the file was marked as being "special", and a restoration engine 554 may be configured to recognize such a modified create time attribute of a file within snapshot 574 as being an inconsistent state indicator 125 for the file. Very little overhead may be required to perform such modifications of create time attributes, and the original attribute value may also be obtained from the modified value efficiently (e.g., by adding 100 years to the create time if the original modification subtracted 100 years) without requiring the original value to be stored. The modification of the create-time attribute of data objects 105 may be reversed when the corresponding backup version 115 has been created, as described below, so that the original create-time attribute value is not lost.

It is noted that, instead of subtracting from the create time attribute value, in some implementations a time period such as 100 years may be added to the create time value to generate the ISI, or some other mathematical manipulation of the create time may be performed. In other implementations, other file attributes (such as size, last modification time, owner, etc.) may be modified to generate the ISI 125. The original (unmodified) values of the attributes may be stored within snapshot 574 or in a separate database in some embodiments. In some implementations, efficient reversibility of the modification may not be required. Similar attribute modification techniques may be applied in some embodiments for data objects 105 other than files (e.g., for file systems, logical volumes, physical volumes, etc.) in some embodiments In some embodiments, techniques other than attribute modification may be employed to generate and/or store ISIs 125. For example, certain operating systems may allow the creation of alternate "streams" which may also be termed "marker streams" associated with a file. A first stream associated with the file may include the data of the file, and an alternate stream, which may sometimes be hidden from users during normal operations, may include any desired metadata for the file, such as an ISI 125. In one specific implementation, for example, an application programming interface (API) or system call provided by the operating system (such as a "CreateFile (filename alternateStreamName)" system call or a "CreateFileMarker (fileName, alternateStreamName)" system call) may allow the generation of such an alternate stream for an existing file. Replicator 551 may be configured to invoke such a system call to generate an ISI 125 in an alternate stream associated with a file 115B to which replication was in progress at the time the pause request was received. In implementations where alternate file streams are supported, the alternate streams may also be stored automatically in snapshot 574, e.g., without any additional operations required from the snapshot generator 553 other than the normal creation of a snapshot.

Having generated the ISIs 125 for any data objects that were in the process of being modified or replicated to at the time replication was paused, replicator 551 may be configured to notify the snapshot generator 553 to proceed with the snapshot (block 613 of FIG. 6). As in the case of the pause request, any desired communication technique may be used for the notification in different implementations. On receiving the notification, snapshot generator 553 may be configured to generate the snapshot, saving the ISIs 125 within the snapshot (block 617). As noted above, the ISIs may be saved automatically in some embodiments, without requiring snapshot generator 553 to perform any additional operations other than standard snapshot generation. In other embodiments, snapshot generator 553 (or replicator 551) may be configured to perform additional operations to store ISIs 125, e.g., in an external database. In some implementations, snapshot generator 553 may be unaware of the existence of the ISIs 125—that is, the generation, storage and use of ISIs may be transparent to the snapshot generator 553.

In some embodiments, the snapshot generator may be configured to notify replicator 551 when the snapshot creation has been completed (block 621). In response, replicator 551 may be configured to remove the ISIs 125 generated earlier for the data objects 105 to which replication was paused, e.g., by reversing the file attribute modifications as described above, or by deleting alternate file streams (block 625). Such a reverse modification may be performed so that the original attribute values are not lost. Replicator 551 may then be configured to resume replication operations that were in progress prior to the pause (block 629). When restoration operations are to be performed, restoration engine 554 may be configured to use the ISIs 125 (e.g., by reading file attribute values or by checking for alternate file streams) to identify the set of files within the snapshot that may not be suitable for full restoration.

In one embodiment, as noted above, ISIs 125 may be stored in external databases instead of being stored within backup aggregates 110 such as snapshots 574. In one such embodiment, for example, a list of the names of the backup versions 115 that are in an inconsistent state may be stored in a database or a catalog, and the presence of the name of a backup version within such a list may be an indication of an inconsistent state. When generating a list of backup versions 115 of data objects from which full restores may be performed, restoration engine 554 may be configured to exclude those backup versions whose names are included in the list. In some embodiments, ISIs may not be used to distinguish between fully-restorable backup versions and inconsistent backup versions as described above; instead, restoration from any backup version 115 may be allowed, and ISIs 125 may be used to distinguish between consistent and inconsistent restored objects after restoration.

ISIs 125 may also be generated in some embodiments in response to a cancellation of a replication job, or if a replication job encounters an error. For example, if a request to cancel a replication job that is currently in progress is received by replicator 551, the replicator may be configured to generate ISIs 125 for the data objects 105 to which replication has begun but has not been completed before canceling the job. Similarly, if an error that would result in a premature termination of a replication job occurs (e.g., if physical storage at which a particular replicated data object 105 is to be stored becomes unreachable or corrupted), replicator 551 may generate ISIs for the data objects 105 where replication was in progress at the time of the error. Snapshot generator 553 may be configured to create snapshots 574, even if one or more replication jobs is canceled or if errors cause replication jobs to terminate. Using ISIs, inadvertent data corruption as a result of a restoration from an incomplete backup version 115 from a snapshot 574 may be avoided, even if the replication job that led to the incomplete backup version terminated prematurely due to a cancellation or an error.

Figure 7:
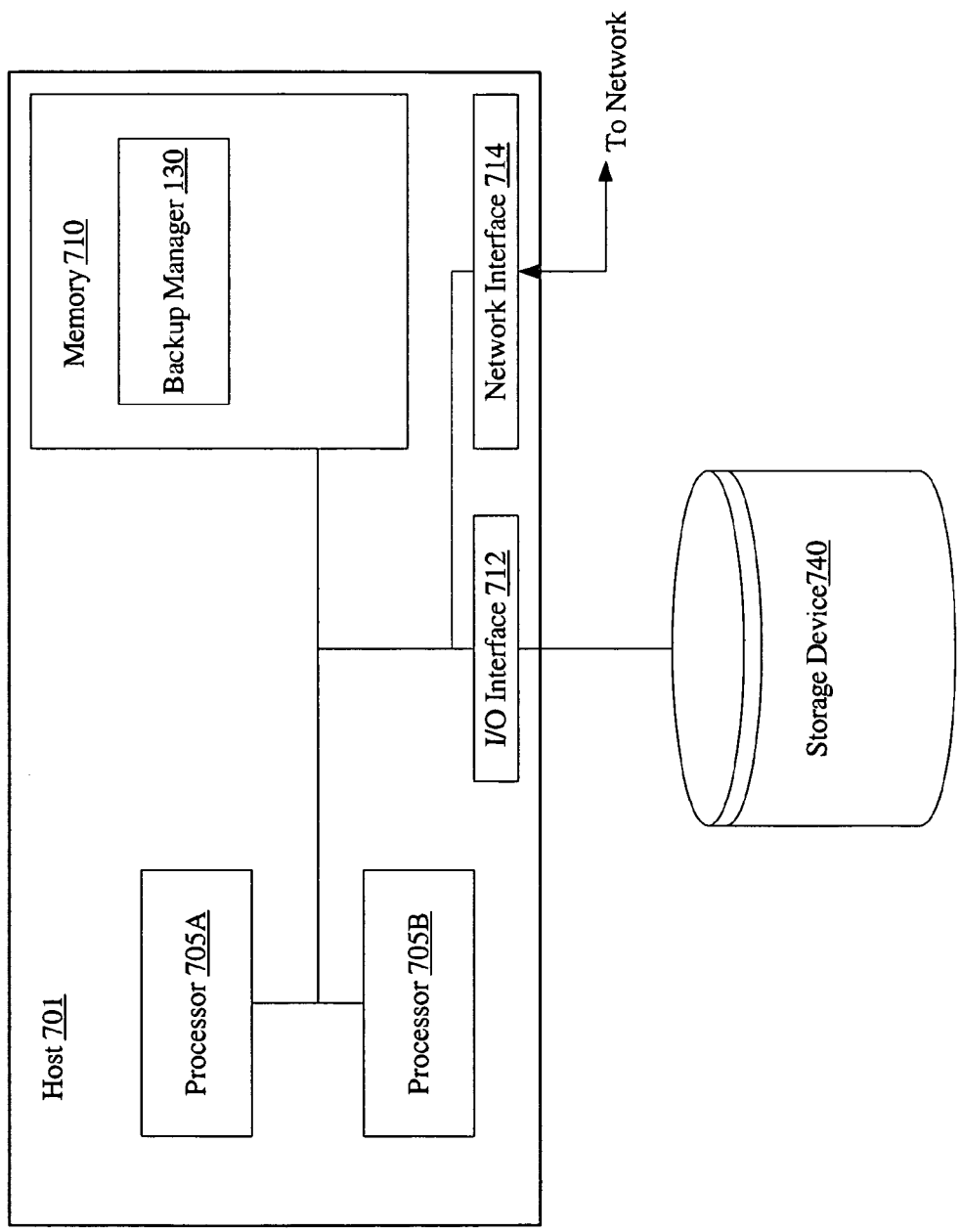
FIG. 7 is a block diagram illustrating constituent elements of a computer host, according to one embodiment.

In various embodiments, at least a portion of backup manager 130 may be executed at primary, secondary or tertiary hosts. FIG. 7 is a block diagram of a computer host 701 that may be deployed as needed as a primary host 501, a secondary host 525, or a tertiary host 565, according to one embodiment. As shown, host 701 may include one or more processors 705, such as processors 705A and 705B. In various embodiments, processors 705 may be implemented using any desired architecture or chip set, such as the SPARC™ architecture from Sun Microsystems, Inc. or the x86-compatible architectures from Intel Corporation, Advanced Micro Devices, Inc., etc. Program instructions that may be executable to implement part or all of the functionality of backup manager 130 may be partly or fully resident within a memory 710 at a given point in time, and may also be stored on a storage device 740. Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712 providing access to storage devices 740, one or more network interfaces 714 providing access to a network, interfaces to display devices (not shown), and the like. Any of a variety of storage devices 740 may be used to store the instructions as well as data for backup manager 130 and/or the contents of primary data objects, secondary data objects and backup aggregations 110 in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 740 may be directly coupled to host 701 in some embodiments (e.g., using the Small Computer Systems Interface (SCSI) protocol), or may be accessible over any desired storage interconnect such as a fiber channel fabric or storage area network (SAN) in other embodiments.

In addition to backup manager 130, memory 710 and/or storage devices 740 may also store operating systems software and/or software for various applications such as backup configuration database 720, administration server 557, etc. in various embodiments. In some embodiments, backup manager 130 may be included within an operating system, a storage management software product or another software package, while in other embodiments, backup manager 130 may be packaged as a standalone product. In one embodiment, one or more components of backup manager 130 described above, such as replicator 551, snapshot generator 553, and/or restoration manager 554 may be implemented as independent software packages or tools. In some embodiments, part or all of the functionality of backup manager 130 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   identifying a first data object of a plurality of data objects as being in an inconsistent state with respect to a second data object, wherein the second data object is not in the plurality of data objects, wherein the first data object is a replica of the second data object, wherein identifying the first data object as being in the inconsistent state comprises identifying the first object as being in a partially replicated state;
   generating a backup aggregation of the plurality of data objects wherein the backup aggregation includes a backup version of the first data object and backup versions of each of the plurality of data objects other than the first data object;
   storing an inconsistent state indicator associated with the first data object in response to identifying the first data object as being in the inconsistent state, wherein the inconsistent state indicator indicates that the backup version of the first data object is a backup version of an inconsistent data object;
   subsequently to generating the backup aggregation, receiving a request to perform a restoration from the backup aggregation;
   in response to the request to perform the restoration, displaying a user interface enabling a user to select one or more backup versions to restore from the backup aggregation, wherein the user interface prevents the user from selecting backup versions of inconsistent data objects for restoration, wherein the backup version of the first data object is prevented from being selected for restoration by the user in response to identifying the backup version of the first data object as a backup version of an inconsistent data object using the stored inconsistent state indicator;
   receiving user input selecting one or more backup versions of one or more data objects other than the first data object from the displayed user interface; and
   restoring the one or more selected backup versions from the backup aggregation.

2. The method as recited in claim 1, wherein preventing the backup version of the first data object from being selected by the user comprises:
   from the backup aggregation, generating a list of backup versions suitable for restoration, wherein the backup version of the first data object is excluded from the list in response to identifying the backup version of the first data object as a backup version of an inconsistent data object using the stored inconsistent state indicator, wherein the backup versions of each of the plurality of data objects other than the first data object are included in the list;
   wherein the user interface displays backup versions included in the list and does not display backup versions excluded from the list.

3. The method as recited in claim 1, wherein the backup aggregation of the plurality of data objects is a snapshot of the plurality of data objects.

4. The method as recited in claim 1, wherein storing the inconsistent state indicator comprises setting an attribute of the first data object to a particular value;
   wherein identifying the backup version of the first data object as a backup version of an inconsistent data object comprises determining that the attribute of the first data object is set to the particular value.

5. The method as recited in claim 4, wherein storing the inconsistent state indicator comprises setting a create-time attribute of the first data object to a particular value;
   wherein identifying the backup version of the first data object as a backup version of an inconsistent data object comprises determining that the create-time attribute of the first data object is set to the particular value.

6. The method as recited in claim 1, wherein the inconsistent state indicator is stored within the backup aggregation.

7. The method as recited in claim 1, wherein the inconsistent state indicator is stored in a database external to the backup aggregation.

8. The method as recited in claim 1, wherein the inconsistent state indicator is included within an alternate file stream.

9. The method as recited in claim 1,
wherein said preventing the user from selecting backup versions of inconsistent data objects for restoration comprises preventing the user from selecting backup versions of inconsistent data objects for a first type of restoration, wherein the backup version of the first data object is prevented from being selected for the first type of restoration by the user in response to identifying the backup version of the first data object as a backup version of an inconsistent data object using the stored inconsistent state indicator;
wherein the user interface enables the user to select the backup version of the first data object for a second type of restoration.

10. The method as recited in claim 9,
wherein the first type of restoration is full restoration;
wherein the second type of restoration is partial restoration.

11. A method, comprising:
identifying a first data object of a plurality of data objects as being in an inconsistent state with respect to a second data object, wherein the second data is not in the plurality of data objects, wherein the first data object is a replica of the second data object, wherein identifying the first data object as being in the inconsistent state comprises identifying the first data object as being in a partially replicated state;
generating a backup aggregation of a plurality of data object, wherein the backup aggregation includes a backup version of the first data object and backup versions of each of the plurality of data objects other than the first data object;
storing an inconsistent state indicator associated with the first data object in response to identifying the first data object as being in the inconsistent state, wherein the inconsistent state indicator indicates that the backup version of the first data object is a backup version of an inconsistent data object;
subsequently to generating the backup aggregation, receiving a request to perform a restoration from the backup aggregation;
in response to the request to perform the restoration:
displaying a first list in a user interface, wherein the first list indicates one or more backup versions of one or more data objects suitable for full restoration, wherein the first list includes one or more backup versions of one or more of the plurality of data objects other than the first data object, wherein the user interface enables the one or more backup versions of the first list to be selected for full restoration;
displaying a second list in the user interface together with the first list, wherein the second list indicates one or more backup versions of one or more data objects suitable for partial restoration, wherein the backup version of the first data object is displayed in the second list in response to identifying the backup version of the first data object as a backup version of an inconsistent data object using the inconsistent state indicator, wherein the user interface enables the backup version of the first data object to be selected from the second list for partial restoration;
receiving user input to the user interface selecting the backup version of the first data object from the second list; and
performing a partial restoration of the first data object using the backup version of the first data object.

12. A system, comprising:
one or more processors; and
memory storing program instructions,
wherein the program instructions are computer-executable by the one or more processors to implement a backup manager configured to:
identify a first data object of a plurality of data objects as being in an inconsistent state with respect to a second data object, wherein the second data object is not in the plurality of data objects, wherein the first data object is a replica of the second data object, wherein identifying the first data object as being in the inconsistent state comprises identifying the first data object as being in a partially replicated state;
generate a backup aggregation of the plurality of data objects, wherein the backup aggregation includes a backup version of the first data object and backup versions of each of the plurality of data objects other than the first data object;
store an inconsistent state indicator associated with the first data object in response to identifying the first data object as being in the inconsistent state, wherein the inconsistent state indicator indicates that the backup version of the first data object is a backup version of an inconsistent data object;
subsequently to generating the backup aggregation, receive a request to perform a restoration from the backup aggregation;
in response to the request to perform the restoration, display a user interface enabling a user to select one or more backup versions to restore from the backup aggregation, wherein the user interface prevents the user from selecting backup versions of inconsistent data objects for restoration, wherein the backup manager is configured to prevent the backup version of the first data object from being selected for restoration by the user in response to identifying the backup version of the first data object as a backup version of an inconsistent data object using the stored inconsistent state indicator;
receive user input selecting one or more backup versions of one or more data objects other than the first data object from the displayed user interface; and
restore the one or more selected backup versions from the backup aggregation.

13. The system as recited in claim 12, wherein in preventing the backup version of the first data object from being selected by the user, the backup manager is configured to:
generate a list of backup versions suitable for restoration from the backup aggregation, wherein the backup version of the first data object is excluded from the list in response to identifying the backup version of the first data object as a backup version of an inconsistent data object using the stored inconsistent state indicator, wherein the backup versions of each of the plurality of data objects other than the first data object are included in the list;
wherein the backup manager is configured to display the user interface such that the user interface displays backup versions included in the list and does not display backup versions excluded from the list.

14. The system as recited in claim 12, wherein the backup aggregation of the plurality of data objects is a snapshot of the plurality of data objects.

15. The system as recited in claim 12, wherein storing the inconsistent state indicator comprises setting an attribute of the first data object to a particular value;

wherein identifying the backup version of the first data object as a backup version of an inconsistent data object comprises determining that the attribute of the first data object is set to the particular value.

16. A computer readable medium comprising program instructions, wherein the program instructions are computer-executable to:

identify a first data object of a plurality of data objects as being in an inconsistent state with respect to a second data object, wherein the second data object is not in the plurality of data objects, wherein the first data object is a replica of the second data object, wherein identifying the first data object as being in the inconsistent state comprises identifying the first data object as being in a Partially replicated state;

generate a backup aggregation of the plurality of data objects, wherein the backup aggregation includes a backup version of the first data object and backup versions of each of the plurality of data objects other than the first data object;

store an inconsistent state indicator associated with the first data object in response to identifying the first data object as being in the inconsistent state, wherein the inconsistent state indicator indicates that the backup version of the first data object is a backup version of an inconsistent data object;

subsequently to generating the backup aggregation, receive a request to perform a restoration from the backup aggregation;

in response to the request to perform the restoration, display a user interface enabling a user to select one or more backup versions to restore from the backup aggregation, wherein the user interface prevents the user from selecting backup versions of inconsistent data objects for restoration, wherein the program instructions are computer-executable to prevent the backup version of the first data object from being selected for restoration by the user in response to identifying the backup version of the first data object as a backup version of an inconsistent data object using the stored inconsistent state indicator;

receive user input selecting one or more backup versions of one or more data objects other than the first data object from the displayed user interface; and restore the one or more selected backup versions from the backup aggregation.

17. The computer readable medium as recited in claim 16, wherein in preventing the backup version of the first data object from being selected by the user, the program instructions are computer-executable to:

generate a list of backup versions suitable for restoration from the backup aggregation, wherein the backup version of the first data object is excluded from the list in response to identifying the backup version of the first data object as a backup version of an inconsistent data object using the stored inconsistent state indicator, wherein the backup versions of each of the plurality of data objects other than the first data object are included in the list;

wherein the program instructions are computer-executable to display the user interface such that the user interface displays backup versions included in the list and does not display backup versions excluded from the list.

18. The computer readable medium as recited in claim 16, wherein the backup aggregation of the plurality of data objects is a snapshot of the plurality of data objects.

19. The computer readable medium as recited in claim 16, wherein storing the inconsistent state indicator comprises setting an attribute of the first data object to a particular value;

wherein identifying the backup version of the first data object as a backup version of an inconsistent data object comprises determining that the attribute of the first data object is set to the particular value.

\* \* \* \* \*